United States Patent [19]

Miles, Jr.

[11] Patent Number: 5,045,005
[45] Date of Patent: Sep. 3, 1991

[54] MARINE ENGINE EXHAUST SYSTEM AND METHOD

[75] Inventor: Charles C. Miles, Jr., Longwood, Fla.

[73] Assignee: Marine Muffler Corporation, Apopka, Fla.

[21] Appl. No.: 507,124

[22] Filed: Apr. 10, 1990

Related U.S. Application Data

[62] Division of Ser. No. 322,408, Mar. 13, 1989, Pat. No. 4,917,640.

[51] Int. Cl.$^5$ ............................................. B63H 21/32
[52] U.S. Cl. ...................................... 440/89; 181/232; 60/272
[58] Field of Search ...................... 440/88, 89; 60/310, 60/272; 181/212, 232, 235, 238, 269, 272, 273, 281, 282

[56] References Cited

U.S. PATENT DOCUMENTS

| 784,833 | 3/1905 | Brush | 181/232 |
| 1,015,955 | 1/1912 | Helder | 181/232 |
| 4,416,350 | 11/1983 | Hayashi | 181/272 |

Primary Examiner—Jesus D. Sotelo
Attorney, Agent, or Firm—Duckworth, Allen, Dyer & Doppelt

[57] ABSTRACT

A marine engine exhaust system and method utilizes first and second enclosed, generally tubular chambers having generally parallel lengthwise dimensions and internal intermediatae exhaust passageways spaced along the lengthwise dimension of the second chamber for circulating the exhaust gases through the first chamber, laterally through the intermediate exhaust passageways into the second chamber, along the lengthwise dimension of the second chamber and thence out of an outlet exhaust passageway which passes through the second chamber wall and may also extend through a cooling water-collecting portion of the first chamber to achieve maximum muffling of the exhaust gas noise.

11 Claims, 3 Drawing Sheets

MARINE ENGINE EXHAUST SYSTEM AND METHOD

This is a division, of application Ser. No. 07/322,408 filed Mar. 13, 1989, now U.S. Pat. No. 4,917,640.

BACKGROUND OF THE INVENTION

This invention relates to methods and apparatus for muffling and handling exhaust gases and cooling fluids emitted from a marine engine.

DESCRIPTION OF THE PRIOR ART

Muffler systems for marine engines differ significantly from mufflers for automobiles, in that the marine engine passes a significant amount of cooling water through the exhaust manifold and into the muffler. This water is ejected into the exhaust system to cool the combustion gases and permit those gases to be discharged through the hull of the boat.

There have been a number of muffling systems developed in the past which are specifically directed to handling both exhaust gases and cooling fluids for marine engines. For example, in U.S. Pat. No. 4,713,029, Ford discloses an "Inverted Flow Marine Engine Exhaust Muffler" utilizing a single chamber, with an inverted tube extending laterally across the single chamber, and with means permitting the exhaust gases to pass through the water at the bottom of the chamber, upwardly through the inverted tube and thence outwardly from the apparatus.

In U.S. Pat. No. 3,296,997, Hoiby et al disclose an "Exhaust and Muffling System For Marine Engines" also formed of a single chamber and with an inverted tubular output into which the exhaust gases flow.

Other marine engine muffling systems are taught in the following U.S. Pat. Nos.: 4,184,566 to Baker et al; 3,431,882 to Irgens; 3,291,252 to Davis; and 1,065,707 to Montgomery. Additionally, other marine engine exhaust systems are disclosed in British Patents 344,735 and 23,980.

Other prior art of interest includes the following U.S. Pat. Nos.: 2,961,059 to Blair; 1,759,679 to Backman; 1,076,571 to Hall; and 1,074,627 to Kenney, as well as USSR patent 1,127,807.

SUMMARY OF THE INVENTION

The present invention contemplates the use of a multiple-chamber exhaust system for marine engines, in which a first enclosed chamber is defined by a first chamber wall and a bottom portion, with a second enclosed chamber being provided with a second chamber wall, a portion of which may be common with the first chamber. The exhaust system includes inlet means extending through the first chamber wall for passing the exhaust gases and cooling fluids from a marine engine into the first chamber, so that liquids entrained within the exhaust gases collect in the bottom portion of the first chamber.

The exhaust system is provided with at least one intermediate exhaust passageway extending from near the bottom portion of the first chamber, through the common portion of the second chamber wall, and thence into the second chamber. The exhaust system is also provided with an outlet exhaust passageway spaced from the intermediate exhaust passageway and extending from the second chamber for venting of the muffled exhaust gases.

In a preferred arrangement, the intermediate exhaust passageway and the outlet exhaust passageway are generally parallel with each other and lateral to the oblong direction of the first and second chambers, with the first and second chambers being generally of a tubular configuration having a lengthwise dimension substantially greater than the dimension lateral to that lengthwise dimension.

In one of the preferred arrangements, the outlet exhaust passageway extends both through the first and second chamber walls, and preferably through the bottom portion of the first chamber, to provide further muffling and cooling of the exhaust gases.

In an alternate form, the exhaust system may be provided with plural intermediate exhaust passageways or plural outlet exhaust passageways, or both, each of which is spaced from the other intermediate and outlet passageways in the second chamber, in order to substantially increase the distance of travel of the exhaust gases between the outflow of the intermediate passageways and the inflow of the exhaust passageways.

In accordance with the method of the present invention, exhaust gases are muffled by providing first and second generally tubular chambers each of which is defined at least partially by a common chamber wall and in which the first and second chambers have generally parallel lenghtwise dimensions which are substantially greater than the dimension lateral to the lengthwise dimension. Exhaust gases and cooling fluid of a marine engine are passed through an inlet into the first chamber in a direction lateral to the lengthwise dimension, and the entrained fluid is collected at a bottom portion of the first chamber which is spaced from the inlet. Further in accordance with the method, the muffler is provided with plural, spaced intermediate exhaust passageways extending laterally to the lengthwise dimension of the first and second chambers, each of which has an inflow end near the bottom and extending through the common chamber wall into the second chamber. The exhaust gases are passed through the inflow end of the intermediate passageways, into the second chamber and thereafter passed into the inflow ends of an exhaust passageway and thence through the first chamber and the bottom portion thereof and out of the first chamber wall for subsequent venting.

DETAILED DESCRIPTION

Figure 1:
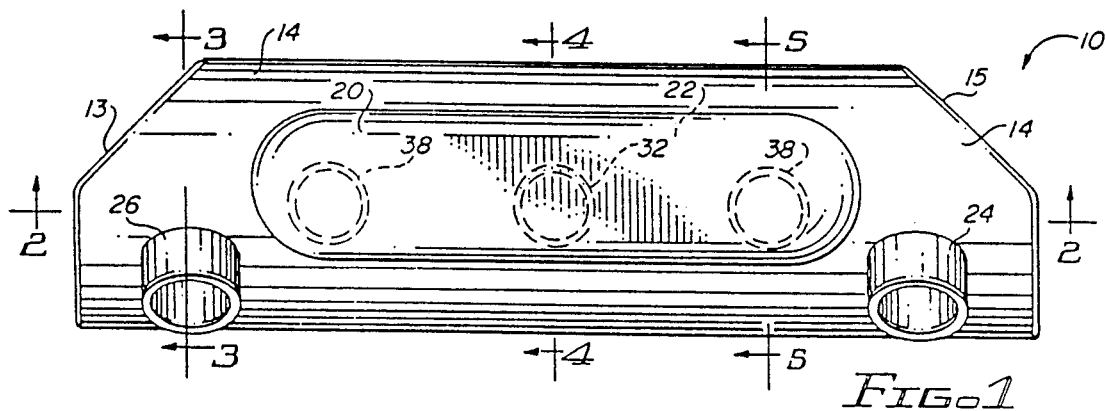
FIG. 1 is a top plan view of a first embodiment of a marine engine exhaust system in accordance with the present invention.

A first embodiment 10 of the marine engine exhaust system in accordance with the present invention is shown in FIGS. 1-5 and is referred to generally by the reference numeral 10. This first embodiment 10 includes a first enclosed chamber 12 defined by a first chamber wall 14 and a bottom portion 16. The exhaust system 10 further includes a second, oblong enclosed chamber 18 defined by a second chamber wall 20, with at least a portion 22 of the chamber wall defining the second chamber 18 being common with the first chamber 12. Inlet passageways 24, 26 at opposite ends of the first chamber 12 extend through the first chamber wall 14 to permit the passage of exhaust gases and cooling fluids from a marine engine (not shown) into the first chamber 12, and so that the entrained cooling liquid (i.e., water) collects in the bottom portion 16 of the first chamber 12.

Figure 2:
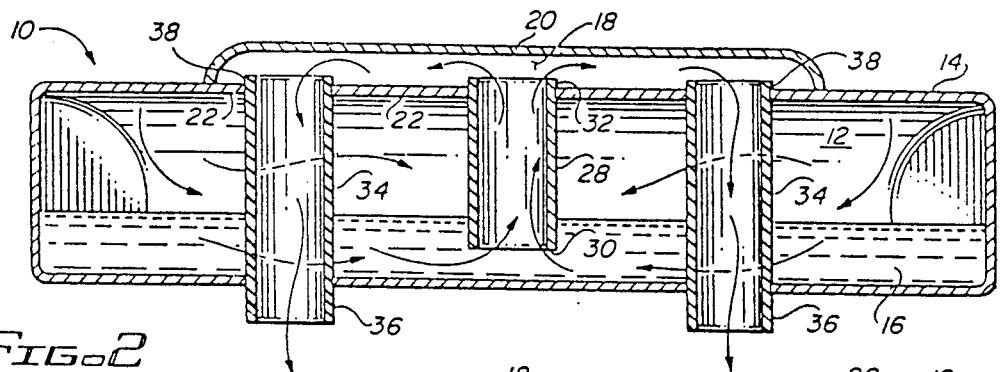
FIG. 2 is a cross-sectional elevation of the exhaust system shown in FIG. 1, taken along the lines 2—2.
Figure 3:
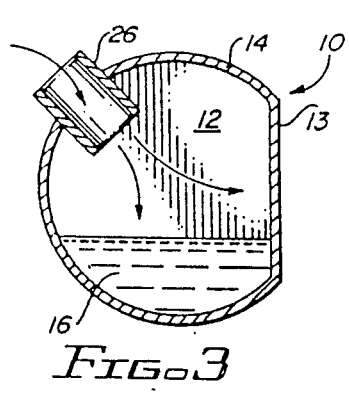
FIG. 3 is a cross-sectional side view of the marine exhaust system shown in FIG. 1, taken along the line 3—3.
Figure 4:
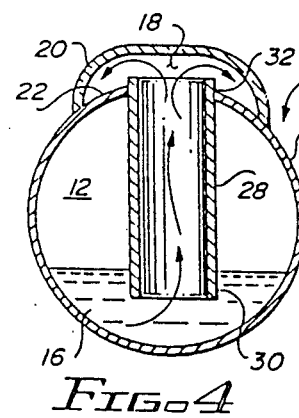
FIG. 4 is a cross-sectional side view of the marine exhaust system shown in FIG. 1, taken along the lines 4—4.

In accordance with the present invention, there is provided at least one intermediate exhaust passageway 28 extending from near the bottom portion 16 of the first chamber 12, through the common chamber wall portion 22 and into the second chamber 18. As is shown in FIGS. 2 and 4, the exhaust gases entering the inlet passageways 24 and 26 circulate through the first chamber 12, through the water collected in the bottom portion 16 and into an inflow opening of the intermediate exhaust passageway 28, and thence out of the outflow opening 32 of that passageway 28 and into the second chamber 18. Although a single intermediate exhaust passageway 28 is shown in the embodiment of FIG. 2, as will be described below with reference to the embodiments of FIGS. 6-7, FIGS. 8-9, FIGS. 10-11 and FIGS. 12-13, the exhaust system of the present invention may be provided with a plurality of such intermediate passageways, so long as the passageways are spaced from each other and from an outlet exhaust passageway (described next), in order to permit lateral circulation of the exhaust gases across the lengthwise dimension of the second chamber 18.

Figure 5:
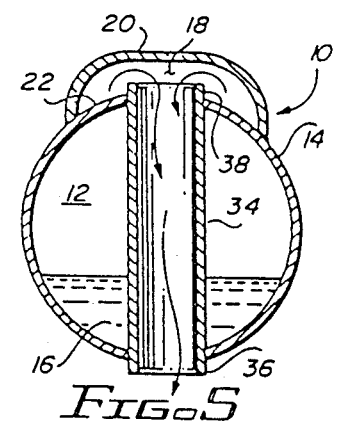
FIG. 5 is a cross-sectional side view of the marine exhaust system shown in FIG. 1, taken along the lines 5—5.

The exhaust system 10 further includes at least one outlet exhaust passageway 34 spaced from the intermediate exhaust passageway 28 and extending from the second chamber 18, through the first chamber 12 and its bottom portion 15, and thence through the first chamber wall 14 for venting of the muffled exhaust gases. As is illustrated in FIGS. 2 and 5, the exhaust gases passing through the outflow opening 32 of the intermediate exhaust passageway 28 move laterally along the lengthwise dimension of the second chamber 18, and into the inflow opening 38 of each outlet exhaust passageway 34 down the lengthwise dimension of each such outlet exhaust passageway and thence through the outflow opening 36 of each outlet exhaust passageway.

Further in accordance with the present invention and as is illustrated in FIGS. 1 and 2, the first and second chambers 12 and 18, respectively, are each defined in at least a partially tubular configuration having a lengthwise dimension substantially greater than the dimension lateral to each respective lengthwise dimension. Further, all of the intermediate and outlet exhaust passageways 28 and 34, respectively, are generally parallel with each other and extend generally laterally across the lengthwise dimension of the first and second chambers 12 and 18. As is further shown in FIG. 1, the lengthwise dimensions of the first and second chambers 12 and 18 are generally parallel with each other. It will be understood from the cross sectional view of FIG. 2 that the common chamber wall portion 22 is spaced from the bottom portion 16 across the first chamber 12, in order to create a more circuitous path for the exhaust gases passing from the first chamber 12 into the second chamber 18.

Figure 6:
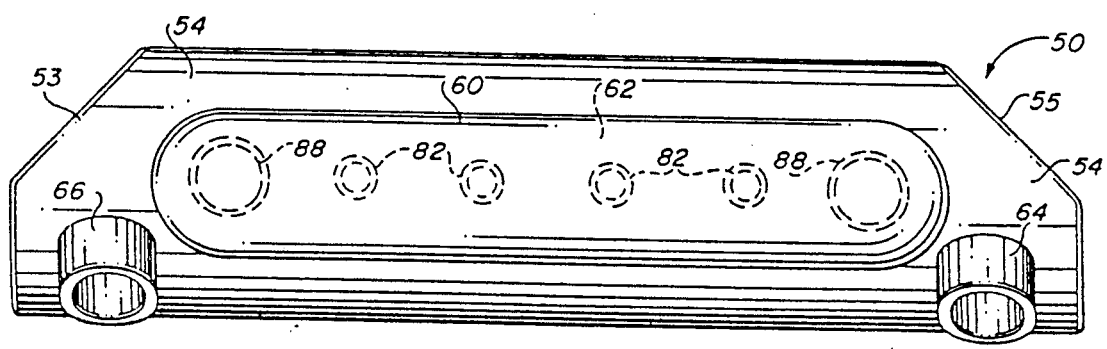
FIG. 6 is a top plan view of a second form of a marine exhaust system in accordance with the present invention.
Figure 7:
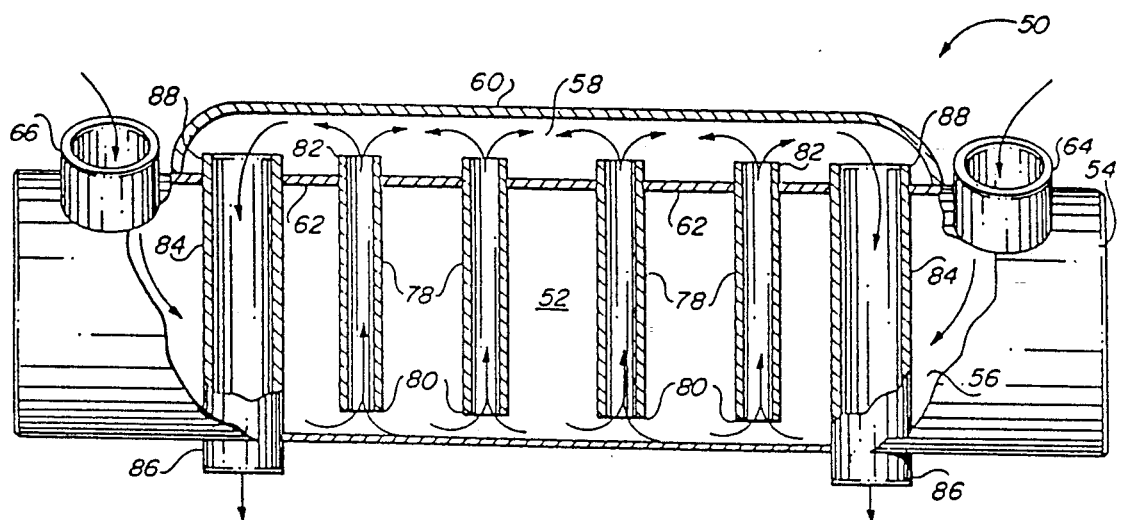
FIG. 7 is a front elevation of the marine exhaust system shown in FIG. 6, with a portion of the system broken away to illustrate the internal parts.

A second embodiment of an exhaust system in accordance with the present invention is shown in FIGS. 6 and 7 and referred to generally by the reference numeral 50. The exhaust system 50 includes a first chamber 52 defined by a first chamber wall 54 and a bottom portion 56 in which cooling fluids are collected (the cooling fluids are not shown in FIG. 7, but are depicted in FIG. 2 for illustration purposes).

The exhaust system 50 further includes a second chamber 58 defined by a second chamber wall 60 and a common wall portion 62 between the second chamber 58 and the first chamber 52.

The exhaust system 50 further includes inlet exhaust passageways 64, 66 at opposing ends of the first chamber 52, plural intermediate exhaust passageway 78 and plural outlet exhaust passageways 84. The embodiment of FIGS. 6 and 7 differs from the embodiment of FIGS. 1-5 in that four intermediate exhaust passageways 78 are provided spaced along the common wall portion 62 between the two outlet exhaust passageways 84. As is shown by the arrows in FIG. 7, the exhaust gas flow is generally the same as that depicted in FIG. 2. and achieves a lateral flow across the second chamber 58 between the outflow openings 82 of the intermediate exhaust passageway 78 and the inflow openings 88 of the outlet exhaust passageways 84.

Figure 8:
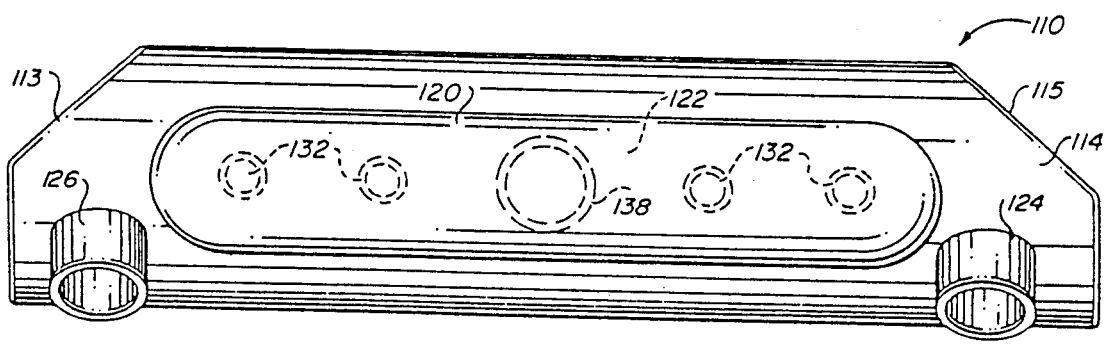
FIG. 8 is a top plan view of a third form of a marine exhaust system in accordance with the present invention.
Figure 9:
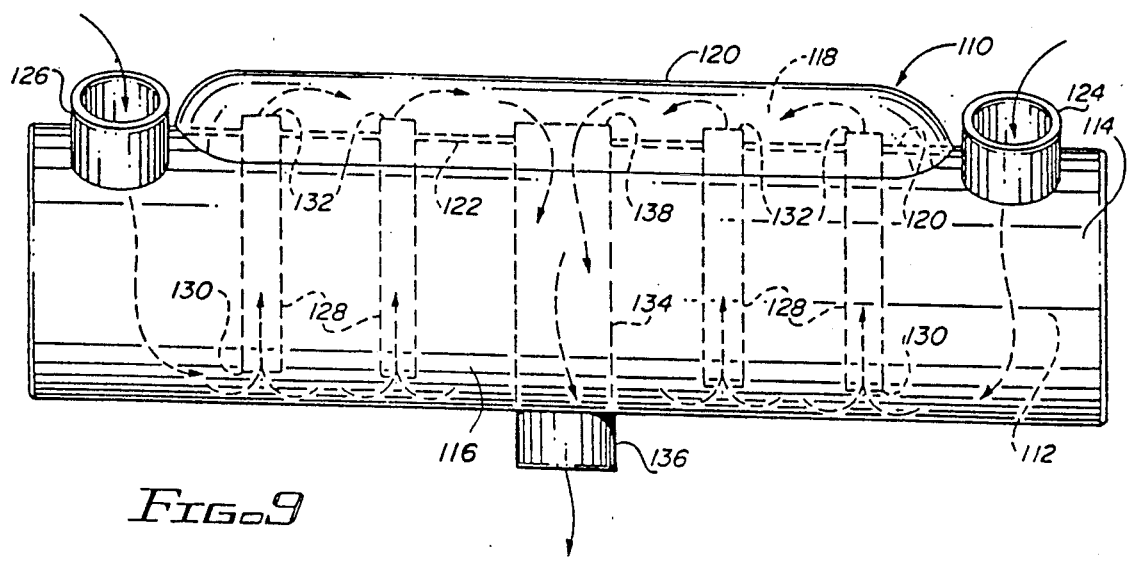
FIG. 9 is a front elevation of the marine exhaust system shown in FIG. 8, and in which internal parts of the exhaust system are shown by dotted lines.

A third embodiment of the marine exhaust system is shown in FIGS. 8 and 9, and refer to generally by the reference numeral 110. The embodiment of FIGS. 8-9 achieves the same objectives as the embodiment shown in FIGS. 1-5 and FIGS. 6 and 7, except that the outlet exhaust passageway 134 is centrally located along the common chamber wall portion 122, and the plural intermediate exhaust passageways 128 are spaced along the common wall portion 122 between the two extremities of the second chamber 118. As with the earlier described embodiments, the exhaust system 110 includes a first chamber 112 defining a first chamber wall 114, a bottom portion 116, and a second chamber wall 120, as well as inlet exhaust passageways 124 and 126. The flow of exhaust gases out of the intermediate exhaust passageways 128 into the outlet exhaust passageway 134 is again defined laterally along the lengthwise dimension of the second chamber 118, and thence out of the outlet exhaust passageway 134, in the manner described above.

Figure 10:
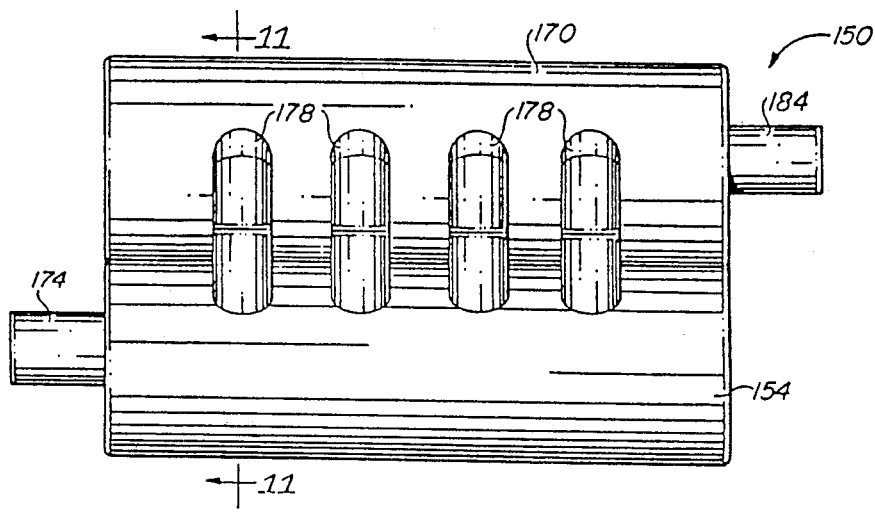
FIG. 10 is a top plan view of a fourth form of a marine exhaust system in accordance with the present invention.
Figure 11:
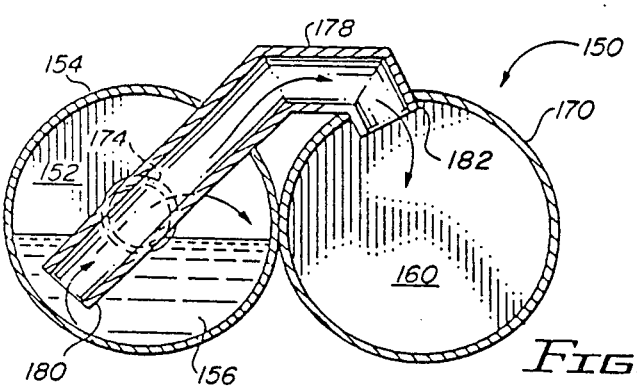
FIG. 11 is a cross-sectional side view of the marine exhaust system shown in FIG. 10, taken along the lines 11—11.

A fourth embodiment of a marine exhaust system in accordance with the present invention is shown in FIGS. 10 and 11 and referred to there generally by the reference numeral 150. The exhaust system 150 includes a first chamber 152 defined by a first chamber wall 154 and a bottom portion 156 into which cooling water passing through the inlet exhaust passageway 174 collects. The exhaust system 150 further includes a second chamber 160 abutting the first chamber 152, the second chamber 160 being defined by a second chamber wall 170. The exhaust system 150 further includes an intermediate exhaust passageway 178 having an inflow opening 180 extending into the bottom portion 156 of the first chamber 152, and an outflow opening 182 extending into the second chamber 160. As is shown in FIG. 10, a plurality (for example, four) intermediate exhaust passageways 178 are provided. The exhaust gases collected in the second chamber 160 circulate laterally along that chamber and thence out of an outlet exhaust passageway 184. Unlike the three embodiments described above, the outlet exhaust passageway 184 does not pass back through the first chamber 152, the bottom portion 156 and out of the first chamber wall 154; however, such a circuitous arrangement could be utilized as necessary to achieve a greater degree of muffling of the exhaust gases.

Figure 12:
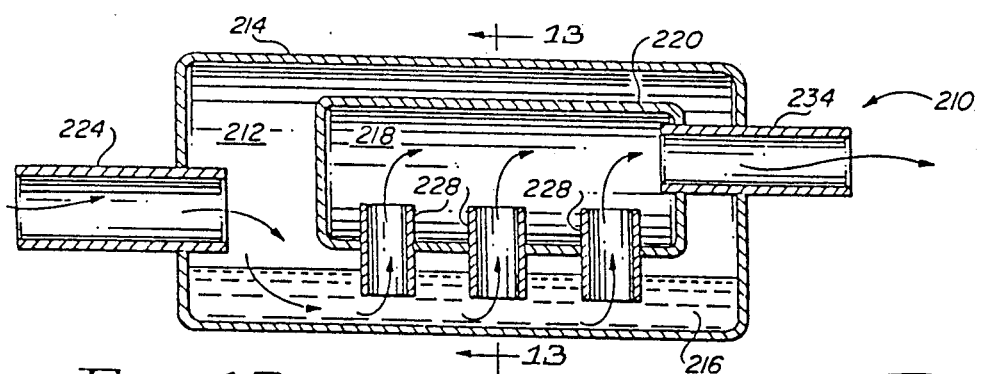
FIG. 12 is a cross-sectional front view of a fifth form of a marine exhaust system in accordance with the present invention.
Figure 13:
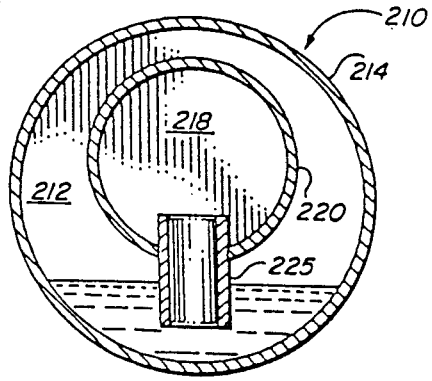
FIG. 13 is a cross sectional side view of the marine exhaust system shown in FIG. 12, taken along the lines 13—13.

A fifth embodiment of a marine exhaust system in accordance with the present invention is shown in FIGS. 12 and 13 and referred to generally by the reference numeral 210. In this arrangement, the exhaust system 210 includes a first chamber 212 defined by a first chamber wall 214 and which includes a bottom chamber portion 216. An inlet exhaust passageway 224 passes through one end of the first chamber 212, and entrained cooling water is collected in the bottom portion 216.

In accordance with the present invention, a second chamber 218 is enclosed within the first chamber 212, and is defined by a second chamber wall 220 the entire circumference of which is common to the first chamber 212. The exhaust system 210 includes a plurality of intermediate exhaust passageways 228 which have inflow openings extending into the bottom portion 216 of the first chamber 212, and outflow openings extending into the second chamber 218, the plurality of intermediate exhaust passageways 228 being laterally spaced across the lengthwise dimension of the second chamber 218. The exhaust system 210 further includes an outlet exhaust passageway 234 which passes through both the second chamber wall 220 and the first chamber wall 214, for venting of muffled exhaust gases. As with the other embodiments described above, the exhaust system 210 of FIGS. 12 and 13 directs the exhaust gases in a direction lateral to the direction of inflow from the inlet passageway through the intermediate exhaust passageways, and thence laterally along the lengthwise dimension of the second chamber before exiting through the outlet exhaust passageway. Thus, the exhaust gases passing into and out of each embodiment of the muffler system of the present invention is cause to change direction, and to flow laterally along the second chamber, and then out of the second chamber and, when maximum muffling of the noise level of the exhaust gases is desired, is then passed again through the first chamber, the bottom-water collecting portion of the first chamber and thence through the first chamber wall. In each instance, the inflow opening of the outlet exhaust passageway is spaced substantially along the lengthwise dimension of the second chamber from the outflow openings of the intermediate exhaust passageways, in order to maximize the lateral flow of the exhaust gases down the lengthwise dimension of the second chamber.

What is claimed is:

1. An exhaust muffler for marine engines, comprising:
   a first enclosed chamber defined by a generally cylindrical first chamber wall and a bottom portion within the first chamber;
   an inlet passageway extending into the first chamber for passing exhaust gases from a marine engine into the first chamber, and so that cooling liquids entrained with the exhaust gases collect in the bottom portion of the first chamber;
   a second enclosed chamber defined by a generally cylindrical second chamber wall, the second enclosed chamber positioned laterally alongside and adjacent to the first enclosed chamber and wherein the axis of the second generally cylindrical chamber wall is not coaxial with the axis of the first generally cylindrical chamber wall;
   a plurality of intermediate exhaust passageways extending from the bottom portion of the first chamber, through the first cylindrical chamber wall in a direction lateral to the axis of the first chamber wall and through the second cylindrical chamber wall into the second chamber; and
   an outlet exhaust passageway extending out of the second chamber for venting the muffled exhaust gases.

2. The exhaust muffler for marine engines recited in claim 1 wherein the axes of the first and second cylindrical chamber walls are generally parallel.

3. The exhaust muffler for marine engines recited in claim 2 wherein the intermediate exhaust passageways extend through the first chamber wall in a direction generally normal to the axis of the first chamber wall.

4. The exhaust muffler for marine engines recited in claim 1 wherein the inlet passageway extend into one end of the first chamber and is generally parallel with the axis of the first generally cylindrical chamber wall.

5. The exhaust muffler for marine engines recited in claim 4 wherein the outlet exhaust passageway extends out of one end of the second chamber and is generally parallel with the axis of the second generally cylindrical chamber wall.

6. The exhaust muffler for marine engines recited in claim 5 wherein the one end of the first chamber and the one end of the second chamber are at different and opposite ends with respect to each other and the respective first and second chambers.

7. The exhaust muffler for marine engines recited in claim 1 wherein the plurality of intermediate exhaust passageways are all generally parallel with each other.

8. An exhaust muffler for marine engines comprising:
   a first enclosed chamber defined by a first chamber wall and a bottom portion;
   inlet means extending into the first chamber for passing exhaust gases from a marine engine into the first chamber and so that cooling liquids entrained with the exhaust gases collect in the bottom portion of the first chamber;
   a second enclosed chamber having a second chamber wall, the second enclosed chamber enclosed within the first enclosed chamber wall and positioned above the bottom portion, so that the liquid within the bottom portion passes underneath the second enclosed chamber;

at least one intermediate exhaust passageway extending from the bottom portion of the first chamber and through the second chamber wall into the second chamber, so that the liquids contained within the bottom portion can pass into the second chamber; and an outlet exhaust passageway extending from the second chamber and through the first chamber wall for venting of muffled exhaust gases.

9. The exhaust muffler for marine engines recited in claim 8 wherein the first and second enclosed chambers are generally cylindrical.

10. The exhaust muffler for marine engines recited in claim 9 wherein the inlet and outlet exhaust passageways extend generally parallel to the axis of the generally cylindrical first and second chambers.

11. The exhaust muffler for marine engines recited in claim 10 wherein the intermediate exhaust passageway extends generally lateral to the axis of the cylindrical first and second chambers.

* * * * *